(12) United States Patent
Lee et al.

(10) Patent No.: US 9,530,153 B2
(45) Date of Patent: *Dec. 27, 2016

(54) RETARGETING IN A SEARCH ENVIRONMENT

(71) Applicant: Google Inc., Mountain View, CA (US)

(72) Inventors: Wei-Hsin Lee, Saratoga, CA (US); Jacob D. Schonberg, San Francisco, CA (US); Chiu Wah Kelvin So, Mountain View, CA (US); Jianfeng Shen, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/870,725

(22) Filed: Sep. 30, 2015

(65) Prior Publication Data

US 2016/0019589 A1    Jan. 21, 2016

Related U.S. Application Data

(63) Continuation of application No. 14/176,845, filed on Feb. 10, 2014, now Pat. No. 9,177,329, which is a (Continued)

(51) Int. Cl.
*G06F 17/30* (2006.01)
*G06Q 30/02* (2012.01)

(52) U.S. Cl.
CPC ....... *G06Q 30/0256* (2013.01); *G06F 17/3089* (2013.01); *G06F 17/30554* (2013.01); *G06F 17/30867* (2013.01); *G06Q 30/0275* (2013.01)

(58) Field of Classification Search
None
See application file for complete search history.

(56) References Cited

U.S. PATENT DOCUMENTS 7,865,404 B2 * 1/2011 Peckover ............... G06Q 30/02
705/26.61
2006/0242017 A1 10/2006 Libes et al.
(Continued)

FOREIGN PATENT DOCUMENTS

KR WO 2004084109 A1 * 9/2004 ............. G06Q 30/02

OTHER PUBLICATIONS

Notice of Allowance on U.S. Appl. No. 13/222,380 dated Oct. 7, 2013.
(Continued)

*Primary Examiner* — Hung Q Pham
(74) *Attorney, Agent, or Firm* — Foley & Lardner LLP; John D. Lanza; James De Vellis

(57) ABSTRACT

Methods, systems, and apparatus, including computer programs encoded on a computer storage medium, for retargeting content in a search environment. A method can include receiving a request for a content item to be provided with a search results page and determining that one or more retargeted content items are eligible for presentation with the search results page. Each retargeted content item is a content item that is eligible for presentation with the search results page based on: (1) the search query matching a targeting keyword for the retargeted content item, and (2) the user identifier matching a retargeted identifier that is included in a retargeting set for the retargeted content item. A responsive content item to be presented with the search results page is selected, based at least in part on bids that are associated with the retargeted content items, and data specifying the responsive content item are provided.

20 Claims, 5 Drawing Sheets

Related U.S. Application Data continuation of application No. 13/222,380, filed on Aug. 31, 2011, now Pat. No. 8,650,188.

(56) References Cited

U.S. PATENT DOCUMENTS

2007/0005433 A1    1/2007   Lee et al.
2012/0158490 A1    6/2012   Neumeyer et al.

OTHER PUBLICATIONS

Notice of Allowance on U.S. Appl. No. 14/176,845 dated Aug. 6, 2015.
Office Action on U.S. Appl. No. 13/222,380 dated Apr. 3, 2013.
Office Action on U.S. Appl. No. 14/176,845 dated Apr. 2, 2015.

* cited by examiner

RETARGETING IN A SEARCH ENVIRONMENT

CROSS REFERENCE TO RELATED APPLICATIONS

This application is a continuation of and claims priority under 35 U.S.C. §120 to U.S. application Ser. No. 14/176,845, filed on Feb. 10, 2014, which is a continuation of and claims priority under 35 U.S.C. §120 to U.S. application Ser. No. 13/222,380, now U.S. Pat. No. 8,650,188, filed on Aug. 31, 2011, each of which is incorporated herein by reference in their entirety.

BACKGROUND

This specification relates to content selection and distribution.

The Internet provides access to a wide variety of resources. For example, video and/or audio files, as well as web pages for particular subjects or particular news articles are accessible over the Internet. Access to these resources presents opportunities for advertisements to be provided with these resources and search results pages that facilitate identification of these resources. For example, a web page (e.g., a search results page) can include advertisement slots in which advertisements can be presented. These advertisements slots can be defined in the web page or defined for presentation with the web page, for example, in a pop-up window.

Advertisement slots can be allocated to advertisers through an auction. For example, advertisers can provide bids specifying amounts that the advertisers are respectively willing to pay for presentation of their advertisements. In turn, an auction can be performed and the advertisement slots can be allocated to advertisers according to targeting criteria (e.g., targeting keywords) and bids that have been specified by the advertiser. When an advertisement slot for a search results page is being allocated, the advertisement slot can be allocated to one of the advertisers that specified a matching targeting keyword that matches the search query in response to which the search results page is being provided. For example, the advertisement slot can be allocated to the advertiser that specified a matching targeting keyword and provided the highest bid or has a highest auction score (e.g., a score that is computed as a function of a bid and/or advertisement quality measures).

SUMMARY

In general, one innovative aspect of the subject matter described in this specification can be embodied in methods that include the actions of receiving a request for a content item to be provided with a search results page, the request including data indicative of a search query that was submitted by a user device and a user identifier for the user device; identifying a plurality of keyword targeted content items that are eligible for presentation with the search results page, each of the eligible keyword targeted content items being a content item that is eligible for presentation based on the search query matching a targeting keyword for the keyword targeted content item; determining that one or more retargeted content items are eligible for presentation with the search results page, each of the retargeted content items being a content item that is eligible for presentation with the search results page based on: (1) the search query matching a targeting keyword for the retargeted content item; and (2) the user identifier matching a retargeted identifier that is included in a retargeting set for the retargeted content item, each retargeted identifier in the retargeting set for the retargeted content item being a user identifier that was received with interaction data indicating that a target user interaction with a resource previously occurred; selecting, based at least in part on bids that are associated with each of the keyword targeted content items that are eligible for presentation and each of the one or more retargeted content items that are eligible for presentation, a responsive content item to be presented with the search results page; and providing data specifying the responsive content item. Other embodiments of this aspect include corresponding systems, apparatus, and computer programs, configured to perform the actions of the methods, encoded on computer storage devices.

These and other embodiments can each optionally include one or more of the following features. Methods can further include the actions of determining that a particular keyword targeted content item from the plurality of keyword targeted content items and at least one of the retargeted content items are provided by a same content item provider; and removing the particular keyword targeted content item from the plurality of keyword targeted content items that are eligible for presentation with the search results page.

Determining that the particular keyword targeted content item and the at least one retargeted content items are provided by a same content item provider can include determining that the particular keyword targeted content item and the retargeted content item are each included in a same advertisement campaign for the same content item provider.

Methods can further include the actions of identifying a set of retargeted content items having targeting keywords that are matched by the search query; and removing from the set of retargeted content items at least one retargeted content item having a retargeting set that does not include a retargeted identifier that matches the user identifier from the request.

Methods can further include the actions of receiving, from a content item provider, a request to create a retargeting set; and providing, in response to the request, a code segment that upon execution by a browser causes the browser to submit interaction data indicating that the code segment was executed, the interaction data including a set identifier for the retargeting set and a user identifier for the user device that caused execution of the code segment.

Execution of the code segment can be caused by performance of the target user interaction and the interaction data submitted in response to execution of the code segment indicates that the target user interaction occurred. The target user interaction can be a request, by the user device, for a web page in which the code segment is embedded, the web page being provided for the content item provider. The target user interaction can be user interaction with a specified user interface element that is presented on a web page that is provided for the content item provider.

Methods can further include the actions of receiving the interaction data; and including the user identifier from the interaction data in the retargeting set that is associated with the set identifier from the interaction data.

Methods can further include the actions of receiving, from the content item provider, data specifying a set of content items that are only eligible for presentation when the user identifier from the search query matches a retargeted identifier from the retargeting set.

Receiving data specifying the set of content items can include receiving data requesting that a particular a copy of a particular advertisement group be copied; and receiving data indicating that the copy of the particular advertisement group be targeted using the retargeting set. The retargeting set can be associated with temporal expiration data defining a time period during which retargeted identifiers remain in the retargeting set.

Methods can further include the actions of removing a retargeted identifier from a retargeting set based on the temporal expiration data.

Methods can further include the actions of identifying at least one retargeted content item having a targeting keyword that is matched by the search query; determining that the user identifier from the request matches a retargeted identifier for the at least one retargeted content item; determining that the user identifier from the request also matches a particular non-targeted user identifier in a set of non-targeted user identifiers, the set of non-targeted user identifiers specifying one or more user identifiers that must not be matched by the user identifier from the request in order for the at least one retargeted content item to be eligible for presentation; and removing, in response to determining that the user identifier matches the particular non-targeted user identifier, the at least one retargeted content item from the plurality of content items that are eligible for presentation with the search results page.

Particular embodiments of the subject matter described in this specification can be implemented so as to realize one or more of the following advantages. Search based advertisement effectiveness can be increased by enabling advertisers to more specifically target advertisements to users that have previously performed a specified user interaction at the advertiser's website.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
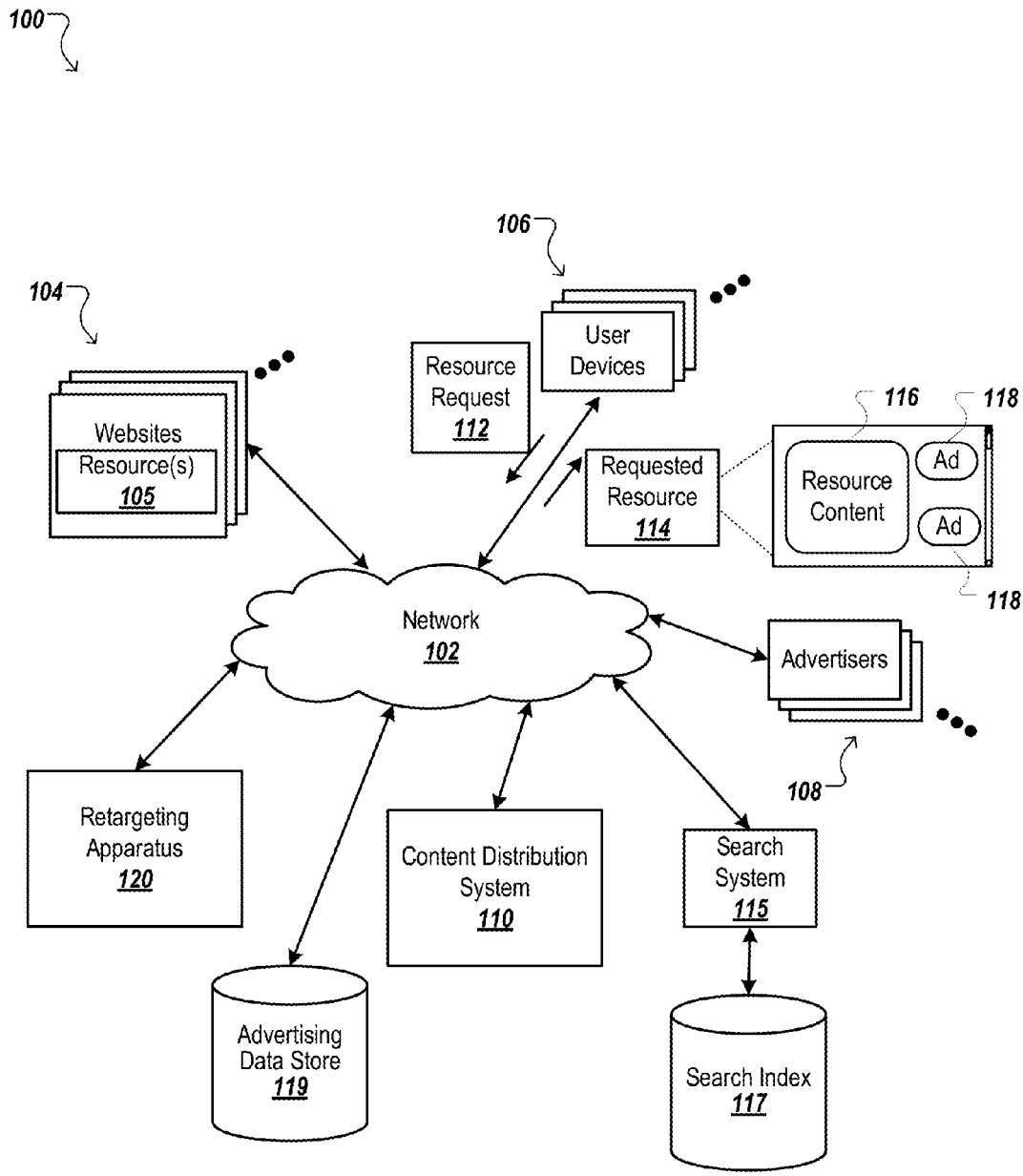
FIG. 1 is a block diagram of an example environment in which a content distribution system manages distribution of content items.

FIG. 1 is a block diagram of an example environment 100 in which a content distribution system 110 manages distribution of content items. The example environment 100 includes a network 102, such as a local area network (LAN), a wide area network (WAN), the Internet, or a combination thereof. The network 102 connects websites 104, user devices 106, advertisers 108, and the content distribution system 110. The example environment 100 may include many thousands of websites 104, user devices 106, and advertisers 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as JavaScript scripts). Units of content that are presented in (or with) resources are referred to as content items. An example of a content item is an advertisement that is presented on a search results page.

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can submit a resource request 112 that requests a resource 105 from a website 104. In turn, data representing the requested resource 114 can be provided to the user device 106 for presentation by the user device 106. The requested resource 114 can be, for example, a home page of a website 104, a search results page in which search results are presented, or another resource 105. The data representing the requested resource 114 can include data that cause presentation of resource content 116 (e.g., search results) at the user device 106. The data representing the requested resource 114 can also include data specifying a portion of the resource (e.g., a portion of a web page) in which advertisements (or other content items) can be presented. Throughout this document, these specified portions of the resource or user display are referred to as advertisement slots 118.

User devices 106 can submit search queries to the search system 115 over the network 102. In response, the search system 115 accesses a search index 117 to identify resources 105 that are relevant to the search query. The search system 115 identifies the resources 105 in the form of search results and returns the search results to the user devices 106 in search results pages. A search result is data generated by the search system 115 that identifies resources 105 that are responsive to a particular search query, and includes a link to the resources 105. An example search result can include a web page title, a snippet of text or a portion of an image extracted from the web page, and the URL of the web page. Search results pages can also include one or more advertisement slots 118 in which advertisements can be presented.

For example, users that are interested in a particular product may research the particular product by submitting one or more search queries to the search system 115 in an effort to identify information that will assist the user in determining whether to purchase the product. For example, a user that is interested in purchasing a DVD player may submit search queries such as "portable DVD player," "cheap DVD player," "Brand X DVD player." In response to each of these search queries, the user may be provided search results that have been identified as responsive to the search query (e.g., have at least a minimum threshold relevance to the search query, for example, based on cosine similarity measures or clustering techniques). The user can then select one or more of the search results to request presentation of a web page or another resource 105 that is referenced by a URL associated with the search result.

When search results are requested by a user device 106, the content distribution system 110 receives a request for advertisements (or another content item) to be provided with the search results. In response to the request, the content distribution system 110 selects advertisements that are determined to be relevant to the search query. In turn, the selected advertisements are provided to the user device 106 for presentation with the search results.

Based on data included in the request for advertisements, the content distribution system 110 selects advertisements that are eligible to be provided in response to the request ("eligible advertisements"). For example, eligible advertisements can include advertisements having characteristics matching the characteristics of the advertisement slots 118 and that are identified as relevant to a search query that has been submitted by a user. Advertisements having targeting keywords that are matched by the search query can be selected as eligible advertisements by content distribution system 110.

For example, an advertisement for "Advertiser A" that sells portable DVD players may be targeted using the targeting keyword "portable DVD player." This targeting keyword would be matched by the search query "portable DVD player" (and possibly other search queries), and may be presented with the search results page that is provided to the user. If the user selects (e.g., clicks) the advertisement for Advertiser A, the user's device can be redirected, for example, to a web page provided for Advertiser A. This web page can include, for example, information about a portable DVD player that Advertiser A sells, a price at which Advertiser A will sell the portable DVD player, and user interface elements that enable the user to specify a number of the DVD players that the user will buy, as well as payment information and shipping information required to complete the transaction.

A targeting keyword can match a search query by having the same textual content ("text") as the resource keyword or search query. For example, an advertisement associated with the targeting keyword "DVD" can be an eligible advertisement for an advertisement request including the search query "DVD."

A targeting keyword can also match a search query by having text that is identified as being relevant to (e.g., having at least a minimum relevance score relative to) a targeting keyword despite having different text than the targeting keyword. For example, an advertisement having the targeting keyword "DVD" may also be selected as an eligible advertisement for an advertisement request including a search query for "Movie Disk" because a DVD is a type of movie disk, and therefore, is likely to be relevant to the term "Movie Disk."

Targeting keywords and other data associated with the distribution of advertisements can be stored in an advertising data store 119. The advertising data store 119 is a data store that stores references to advertisements, advertising campaign parameters that are used to control distribution of the advertisements, data representing conditions under which the advertisement was selected for presentation to a user, and data representing actions taken by users in response to presentation of the advertisement. For example, the advertising data store can store targeting keywords, bids, and other criteria with which eligible advertisements are selected for presentation.

Targeting advertisements using keywords enables an advertiser to target users that, based at least in part on the search queries that the users submit, are considered interested in particular types of products. However, advertisers may want to more specifically target particular advertisements to users that have previously visited one or more of the advertiser's web pages and/or performed other specified actions, referred to as target interactions.

For example, if a user that submits the search query "DVD player" has previously requested, from the advertiser's site, presentation of a web page on which information about available DVD players is presented, the advertiser may consider this user more likely to buy a DVD player. Therefore, the amount the advertiser may be willing to pay to present an advertisement for DVD players to this user may be greater than the amount that the advertiser is willing to pay to present the DVD player advertisement to another user (i.e., that did not previously visit the DVD page on the advertiser's site). Alternatively (or additionally), the advertiser in this example may want to present a special incentive (e.g., offer 10% off of a DVD player) to this user to purchase a DVD player, while not providing the special incentive to other users that did not view the DVD page at the advertiser's site.

In a search environment, the fact that a user submits a particular search query does not provide information about the user's prior online activity. For example, while a user that submits the search query "DVD player" can be considered to be interested in information about DVD players, this search query alone does not indicate whether the user previously viewed the DVD page on a particular advertiser's site. Thus, using keyword targeting alone, it can be difficult for an advertiser target advertisements to users who, prior to submitting a particular search query, have previously performed pre-specified actions (e.g., requested particular pages from the advertiser's site).

The environment 100 includes a retargeting apparatus 120 that facilitates targeting advertisements (or other content items) to a set of users based, at least in part, on the users having previously performed a pre-specified action (i.e., a target interaction). In some implementations, the retargeting apparatus 120 enables an advertiser to create, or request creation of, a retargeting set with which one or more retargeted advertisements (or other content item) can be targeted. A retargeting set is a set of user identifiers for users that have been determined (e.g., based on interaction data) to have performed a target interaction. As described in more detail below, the advertiser can specify the target interaction.

As described in more detail with reference to FIG. 2, an advertiser can request from the retargeting apparatus 120 (e.g., through an advertisement management user interface) a retargeting script that can facilitate population of the retargeting set in response to performance of the target interaction. The retargeting script is a portion of code that can be embedded in one or more of the advertiser's web pages. When the user performs an action that causes execution of the retargeting script (e.g., the user requests the web page or interacts with a specified portion of the web page), the retargeting script provides interaction data to the retargeting apparatus 120.

The interaction data includes data indicating that a user identifier (e.g., a cookie or another user identifier, such as an account identifier) is to be added to a retargeting set. In response to receiving the interaction data, the retargeting apparatus 120 adds the user identifier to a retargeting set that is stored, for example, in the advertising data store 119. When a user identifier is added to a retargeting set, the user identifier is considered to be a retargeted identifier. As used throughout this document the term retargeted identifier refers to a user identifier that has been added to a retargeting set.

Each retargeting script can include, for example, information specifying a set identifier. The set identifier is a unique character string that is indicative of the retargeting set with which the retargeting script is associated. The retargeting script can include the set identifier in the interaction data such that, upon receipt of interaction data, the retargeting apparatus 120 can add user identifiers to the correct retargeting set. For example, if an advertiser created a retargeting set for users that requested presentation of one of the advertiser's web pages, the set identifier for this retargeting set could be included in the retargeting script, and added to interaction data such that the user identifiers for users that requested presentation of the advertiser's web page would be added to this retargeting set.

In some implementations, each retargeting set that is stored in the advertising data store 119 are anonymized to protect the identity of the user with which the user interaction data is associated. For example, each user identifier can be a pseudo-random string that uniquely identifies a user device (or user), but does not indicate the identity of a user. Alternatively (or additionally), the user interaction data can include a hash value of the user identifier rather than the user identifier, thereby further protecting user privacy. In some implementations, user interaction data are only stored for users that opt-in to having user interaction data stored. For example, a user can be provided an opt-in/opt-out user interface that allows the user to specify whether they approve storage of data representing their interactions with content.

In some implementations, the availability (or eligibility) of a retargeting set for targeting purposes can be conditioned on the number of retargeted identifiers in the retargeting set exceeding a pre-specified threshold value. For example, a retargeting set may be considered ineligible to be used to target advertisements until there are at least 500 retargeted identifiers in the retargeting set. Conditioning the availability of a retargeting set based on the number of retargeted identifiers in the retargeting set further protects the identity of the users with which the retargeted identifiers are associated by ensuring that at least a minimum number of different users have performed the target interaction.

The retargeting apparatus 120 can enable an advertiser to target advertisements using one or more retargeting sets. In some implementations, the retargeting apparatus 120 enables an advertiser to specify a set of advertisements (or other content items) that are only eligible for presentation with a search results page when the user identifier that is associated with the content item request (e.g., the user identifier for the user device from which the search query was submitted) matches one of the retargeted identifiers that are included in a specified retargeting set.

For example, an advertiser may select a particular advertisement and specify that the advertisement is to be targeted using the retargeting set. The advertiser can also specify that all advertisements that are included in a particular advertisement group (e.g., a set of one or more advertisements that have been grouped together) or advertisement campaign (e.g., a set of one or more advertisement groups that have been grouped together) are to be targeted using the retargeting set. In this example, the advertisements that are targeted using the retargeting set will only be eligible for presentation when the content item request (e.g., an advertisement request) includes (or references) a user identifier that matches one of the retargeted identifiers in the specified retargeting set.

The retargeting apparatus 120 can enable an advertiser to target advertisements using the retargeting set independent of, or in addition to, other targeting criteria that are used to target the advertisements. For example, an advertiser may copy an existing advertisement group (e.g., using a "copy ad group" function) to create a new instance of the advertisement group. In this example, the advertiser may edit the targeting criteria of the new instance of the advertisement group to specify that advertisements in the advertisement group are only eligible for presentation when one of the retargeted identifiers in a particular retargeting set is matched by the user identifier that is included in the request for advertisements. The eligibility of the advertisements in this example is further conditioned on the other targeting criteria that were previously specified for the advertisement group also being met. For example, assume that the advertisement group that was copied was already targeted using only the targeting keyword "DVD player," and that the advertiser only modified the targeting criteria of the new instance of the advertisement group to also target the advertisement group using the retargeting set. In this example, the advertisements in the new instance of the advertisement group will not be eligible for presentation unless the search query matches the targeting keyword "DVD player" and the user identifier specified by the request matched one of the retargeted identifiers in the retargeting set.

Throughout this document content items that are targeted using a retargeting set are referred to as retargeted content items, while content items that are targeted using targeting keywords and are not targeted using a retargeting set are referred to as keyword targeted content items. Note that both retargeted content items and keyword targeted content items can be targeted using targeting criteria other than that discussed below. For example, any of the content items can also be targeted using geographic information and/or demographic information.

Figure 2:
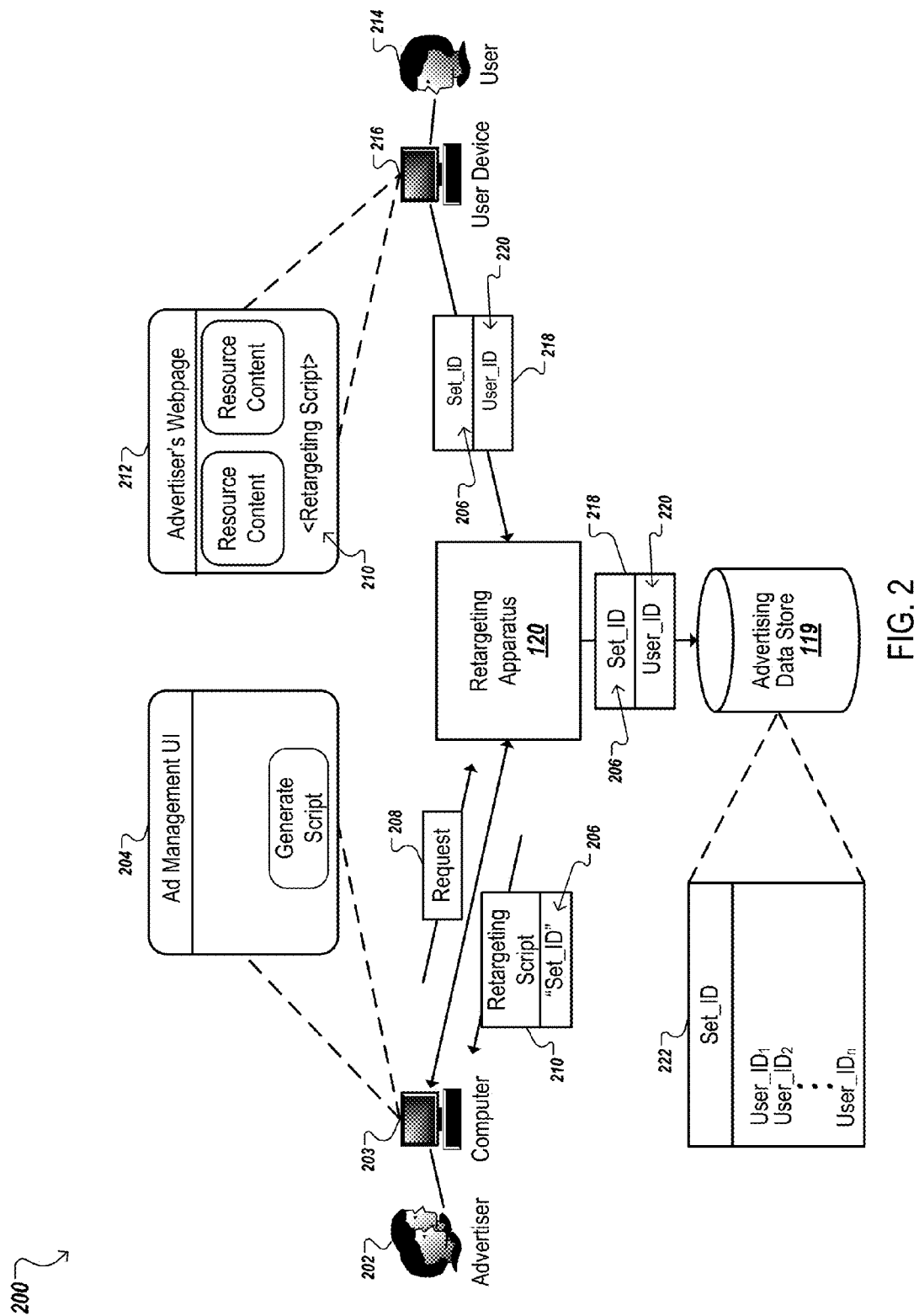
FIG. 2 is an illustration of an example data flow for populating a retargeting set.

FIG. 2 is an illustration of an example data flow 200 for populating a retargeting set. A content item provider, such as an advertiser 202, can create, or request creation of, a retargeting set 222, for example, through an advertisement management user interface 204 that is accessed using a computer 203. For example, an advertiser can access the advertisement management user interface 204 and submit a request 208 for a retargeting script 210, for a retargeting set.

The request 208 can be submitted to the retargeting apparatus 120 in response to the advertiser 202 interacting with (e.g., clicking) a "request script" user interface element 203. In response to the request 208, the retargeting apparatus can generate the retargeting script 210 for the retargeting set 222 and provide the retargeting script 210 to the advertiser 202. In some implementations, the advertiser 202 can create the retargeting script 210 and submit the retargeting script 210 to the retargeting apparatus 120.

The retargeting script 210 can include a set identifier 206 (e.g., "Set ID"). The set identifier 206 can be, for example, a unique character string that is indicative of the retargeting set 222 with which the retargeting script 210 is associated. The set identifier 206 can be a name that the advertiser 202 has specified for the retargeting set 222 or a set of characters that the retargeting apparatus 120 has assigned to the retargeting set 222.

The advertiser can include the retargeting script 210 in the code of one or more of the advertiser's web pages 212. The retargeting script 210 is executed in response to the performance of a target user interaction. In some implementations, the target user interaction can occur when a user requests the web page 212 that includes the retargeting script 210. For example, the advertiser 202 could embed the retargeting script 210 in the web page 212 such that the script is executed when the web page 212 is rendered at a user's device 216 (i.e., in response to the request for the web page).

In some implementations, the target user interaction can occur when the user 214 interacts with (e.g. clicks) a portion of the advertiser's webpage 212. For example, the advertiser 202 could embed the retargeting script 210 in the web page such that user interaction with a particular user interface element (e.g., a particular button or tab) causes execution of the retargeting script 210.

Execution of the retargeting script 210 causes the user device 216 to submit interaction data 218 to the retargeting apparatus 120. The interaction data 218 includes a user identifier 220 associated with the user device 216, such as the character string "User_ID". The interaction data 218 may also include the set identifier 206 for the retargeting set with which the retargeting script 210 is associated.

The retargeting apparatus 120 receives the interaction data 218 and adds the user identifier 220 to the retargeting set associated with the set identifier 206. The retargeting apparatus 120 may store the retargeting set in the advertising data store 119 or another data store. The interaction data 218 can be stored with a reference to (e.g., indexed according to) the set identifier 206 to facilitate identification of the retargeted identifiers that have been added to each retargeting set.

Figure 3:
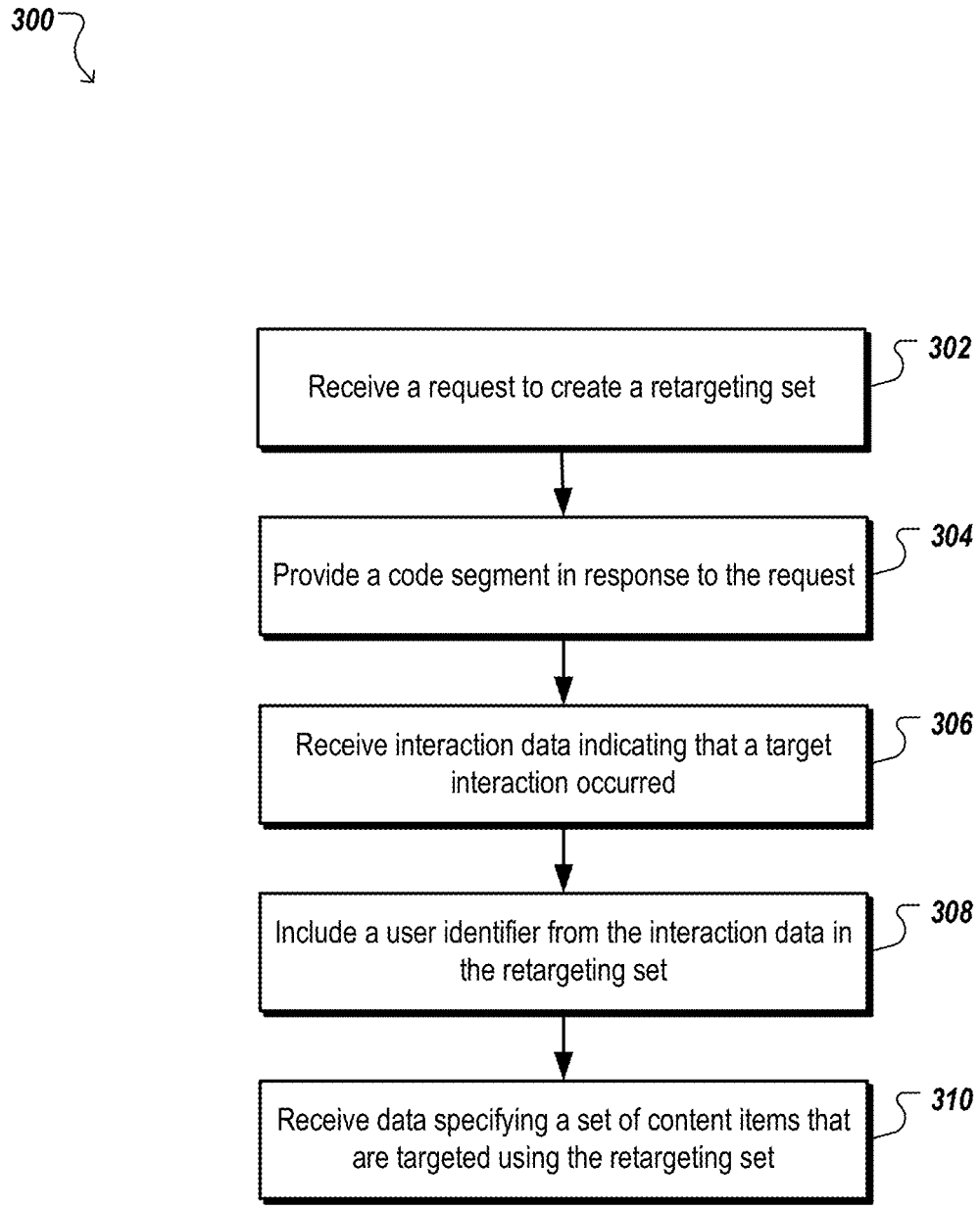
FIG. 3 is a flow chart of an example process for populating a retargeting set.

FIG. 3 is a flow chart of an example process 300 for populating a retargeting set. The process 300 is a process by which a retargeting script can be provided in response to a request to create a retargeting set. As described above, the retargeting script can be embedded in a web page such that performance of a target user interaction causes execution of the retargeting script, which in turn, causes interaction data to be generated. The interaction data are received, and a user identifier that is included in (or referenced by) the interaction data is added to a retargeting set that is also referenced (e.g., by way of a set identifier) by the interaction data. In some implementations, the retargeting set is associated with one or more content items (e.g., advertisements) such that the eligibility of the content items for presentation in response to a content item request is conditioned on the request including a user identifier that is included in the retargeting group.

The process 300 can be implemented, for example, by the retargeting apparatus 120 or another data processing apparatus. In some implementations, the retargeting apparatus 120 is a data processing apparatus that includes one or more processors that are configured to perform actions of the process 300. In some implementations, a non-transitory computer readable medium can include instructions that when executed by a data processing apparatus cause the data processing apparatus to perform actions of the process 300.

A request to create a retargeting set is received (302). The request can include (or reference), for example, a name for the retargeting set. For example, if the retargeting set is being created to identify users that have viewed the advertiser's DVD page (e.g., a web page that provides information about DVD players) the name of for the retargeting set may be "DVD page."

The request can include expiration data indicating when user identifiers are to be removed from the retargeting set. In some implementations, the expiration data specify a maximum amount of time that a particular retargeted identifier may remain in the retargeting set. For example, the advertiser may specify that each retargeted identifier that is added to the retargeting set may only remain in the retargeting set for 14 days after being added to the set. In this example, if a particular retargeted identifier is added to the retargeting set on April $1^{st}$, that particular retargeted identifier will be removed from the retargeting set no later than April $15^{th}$.

In some implementations, the expiration data specify a rate at which retargeted identifiers are removed from the retargeting set. For example, if the expiration data specify that retargeted identifiers should be removed from the retargeting set every 10 days, some or all of the retargeted identifiers that are included in the retargeting set can be periodically removed every 10 days. The portion of the retargeted identifiers that are removed from the retargeting set can be limited to those retargeted identifiers that have been in the retargeting set for more than a pre-specified period of time (e.g., 2 days). Alternatively (or additionally), the expiration data can specify a maximum number (e.g., 10,000) of retargeted identifiers that can be included in the retargeting set. When the maximum number of retargeted identifiers has been reached, an oldest retargeted identifier in the retargeting set can be removed when a next retargeted identifier is added to the retargeting set.

An empty retargeting set can initially be created based on the information included in the request, and the empty retargeting set can be populated with user identifiers for users that perform a target interaction, as described below. The retargeting set may be associated with a set identifier that is used to distinguish the retargeting set from other retargeting sets. For example, when the retargeting set is created, a pseudo-random character string can be associated with the retargeting set, and the retargeting set can be identified using the pseudo-random character string.

A code segment is provided in response to the request (304). In some implementations, the code segment is a retargeting script that upon execution causes a browser to transmit interaction data to a server. As described above, the interaction data indicate that the retargeting script was executed by the browser. The interaction data can include a user identifier for the user device at which the code segment was executed.

In some implementations, execution of the code segment is caused by the performance of a target user interaction such that the interaction data indicates that the target interaction occurred. An advertiser can select the target user interaction and embed the code segment into one or more web pages in a manner that causes execution of the code segment when the user performs the target user interaction. For example, if the target user interaction is selected by an advertiser to be a request by a user device of a particular web page, the advertiser can embed the code segment in the web page in a manner that causes the code segment to be executed when the web page is rendered by the browser. Similarly, if the target user interaction is selected to be user interaction with a particular user interface element (e.g., a "share this" or "more information" user interface element) the code segment can be embedded in the web page in a manner that causes the code segment to be executed in response to user interaction with the user interface element.

Interaction data are received (306). In some implementations, the interaction data that are received are considered an indication that a target user interaction occurred. The interaction data can be received, for example, by a retargeting apparatus (e.g., retargeting apparatus 120 of FIGS. 1 and 2). The interaction data can include a user identifier for a user device from which the interaction data was transmitted. For example, the interaction data can include a user identifier from a "cookie" that is stored at the user device. The cookie may be placed on the user device in response to execution of the code segment. Alternatively, the cookie may have been previously placed on the user device, and upon execution of the code segment the cookie was detected, and the user identifier from the cookie (or the cookie itself) was included in the interaction data.

The interaction data can also include a set identifier that indicates the retargeting set in which the user identifier is to be stored. In some implementations, the submitted interaction data includes a timestamp that can be used to determine an expiration time for the user identifier that is included in the interaction data. If temporal expiration data has been associated with the retargeting set in which the user identifier is included, the time at which the user identifier is removed from the retargeting set can be determined based on the time stamp and the expiration data. For example, if the expiration data indicates that user identifiers are to be removed from a retargeting set 14 days after being added to the retargeting set, a particular user identifier can be removed from the retargeting set when the difference between the time stamp and a current time is at least 14 days.

The user identifier from the interaction data is included in a retargeting set (308). In some implementations, the user identifier is included in the set of retargeted content items that is associated with the set identifier that is specified by the interaction data. For example, when the interaction data is received, the set identifier can be detected, and the user identifier from the interaction data can be stored with a reference to (e.g., indexed according to) the set identifier. Additionally, the timestamp that is included in (or received with) the interaction data can also be stored with the user identifier.

Data are received that specify a set of content items that are targeted using the retargeting set (310). In some implementations, the set of content items includes one or more advertisements that are only eligible for presentation in response to determining that a user identifier that is included in (or referenced by) a content item request matches a user identifier in the retargeting set. For example, an advertiser that has a particular set of advertisements for DVD players may specify that the advertisements are only eligible for presentation with a search results page if the user identifier received with the content item request matches a user identifier that is included in a retargeting set for users that viewed a DVD page on the advertiser's website.

As described above, advertisements can be organized in advertisement groups, and targeting criteria (e.g., targeting keywords) can be specified on a per-advertisement-group basis. In some implementations, an advertiser may want to target a particular advertisement group using targeting criteria other than a retargeting set (e.g., irrespective of whether the user identifier received with the search query matches a user identifier in a retargeting set), and also target the particular set of advertisements using the targeting criteria and the retargeting set. For example, the advertiser may be willing to pay a first price (e.g., $1 per click) for advertisements that are provided in response to search queries that do not include a user identifier that matches a retargeted identifier in the retargeting set, but be willing to pay a second, possibly higher, price (e.g., $5 per click) for advertisements that are provided in response to search queries that include a user identifier that matches a retargeted identifier in the retargeting set.

In these situations, the advertiser can request that a copy of the particular advertisement group be created, and then specify that the copy of the advertisement group be targeted using a specified retargeting set. By specifying that the copy of the advertisement group be targeting using the specified retargeting set, the advertisements that are included in the copy of the advertisement group will only be eligible for presentation if an advertisement request (or another content item request) includes (or references) a user identifier that matches a retargeted identifier from a retargeting set. However, assuming that the initial instance of the advertisement group is not targeted using a retargeting set, the bids for the advertisements in the initial instance of the advertisement group will be eligible for presentation irrespective of the user identifier that is included in the advertisement request (i.e., assuming all of the other targeting criteria for the advertisement group are satisfied). Thus, bids for the advertisements in the copy of the advertisement group will not be submitted to an auction unless the user identifier matches a retargeted identifier from the retargeting set, while the bids for the advertisements in the initial instance of the advertisement group will be submitted to the auction irrespective of the user identifier matching a retargeted identifier for the retargeting set.

In some implementations, a set of content items can be targeted using a Boolean combination of two or more retargeting sets. For example, the data received from an advertiser may specify that a set of advertisements are only eligible for presentation with a search results page if the user identifier received with an advertisement request matches both a retargeted identifier from a first retargeting set and (e.g., Boolean AND) a retargeted identifier from a second retargeting set. As another example, the data received from an advertiser may specify that a set of advertisements are only eligible for presentation with the search results page if the user identifier received with an advertisement request matches a retargeted identifier in one particular retargeting set, but is not included in a second different retargeting set.

For example, an advertiser that sells computers and printers may not want to present an advertisement for a computer to a user that has recently purchased a computer, but may want to present advertisements for printers to users that have recently purchased a computer, but are not known to have purchased a printer. In this example, the advertiser could provide data specifying that an advertisement group that includes advertisements for printers is to be eligible for presentation when the user identifier that is included in the advertisement request includes a user identifier that matches a retargeted identifier in the retargeting set for users that purchased a computer, but is not included in a retargeting set for users that have purchased a printer. The data that are received from the advertiser can also specify other combinations (e.g., AND, OR, NOR, or XOR) of retargeting sets in which a user identifier is to be included for an advertisement to be eligible for presentation.

Advertisers can also adjust bids that are associated with the copy of the advertisement group. For example, an advertiser can specify that the bid for the copy of the advertisement group (i.e., the retargeted advertisement group) have a higher bid (e.g., $5 per click) than the bid (e.g., $1 per click) for the initial instance of the advertisement group (e.g., the keyword targeted advertisement group). Advertisers can further be allowed to change the creatives (e.g., the advertisements that are presented) for the copy of the advertisement group. For example, the advertisers may include advertisements for special offers (e.g., 10% discounts on products) in the retargeted advertisement group, while the keyword targeted advertisement group may include more general informational advertisements that do not include special offers.

Figure 4:
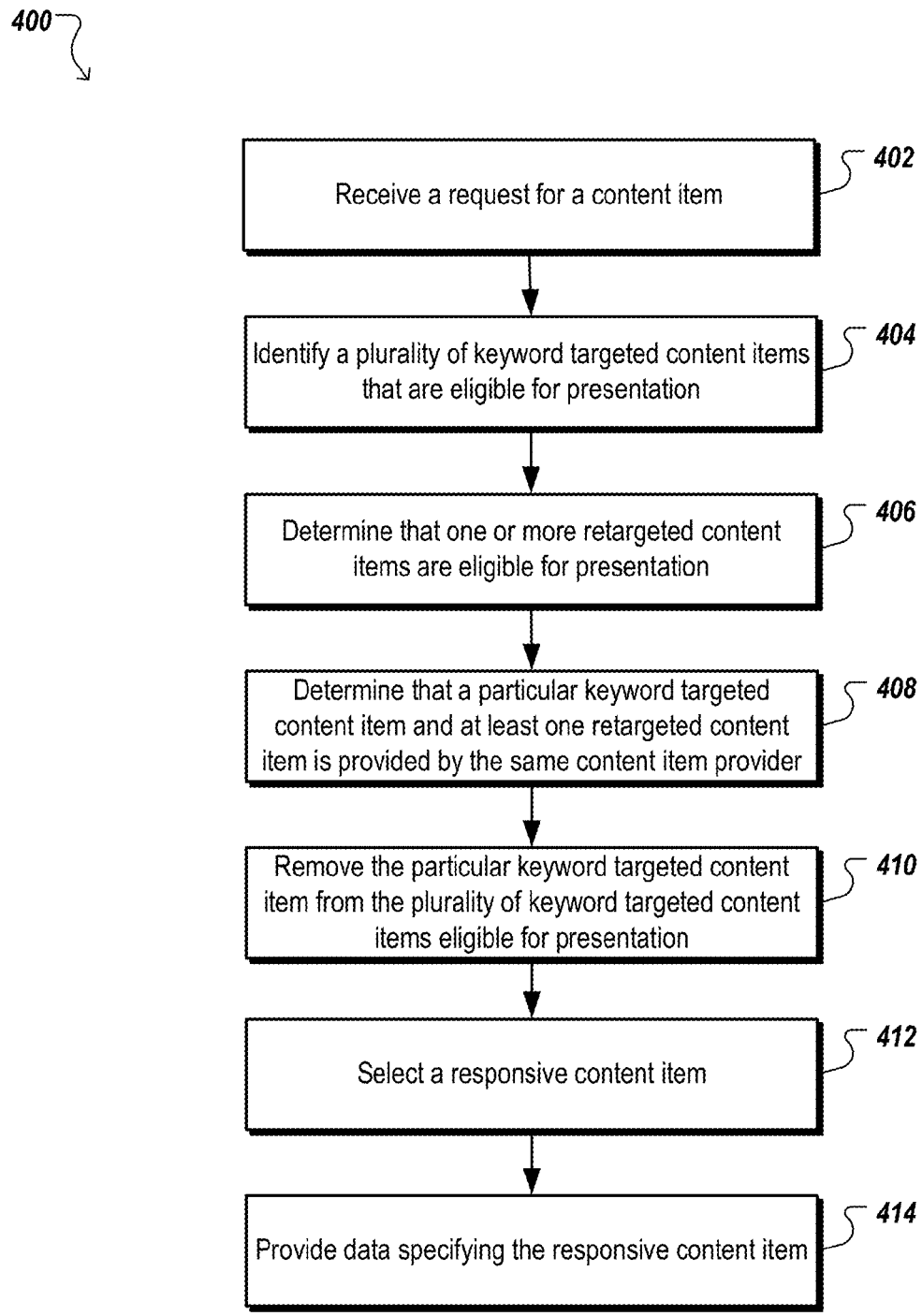
FIG. 4 is a flow diagram of an example process for providing retargeted content items with a search results page.

FIG. 4 is a flow diagram of an example process 400 for providing retargeted content items (e.g., advertisements) with a search results page. The process 400 is a process by which one or more retargeted content items (and/or one or more keyword targeted content items) are determined to be eligible for presentation in response to a content item request. The retargeted content items that are determined to be eligible for presentation can be those retargeted content items that are targeted using a targeting keyword that matches a search query that is referenced by the content item request and that are also targeted using a retargeting set that includes a retargeted identifier that matches a user identifier (e.g., a cookie) that is referenced by the content item request. The keyword targeted content items can be eligible for presentation irrespective of the user identifier that is referenced by the content item request. A responsive content item that is to be provided in response to the content item request is selected based, in part, on bids that are associated with the eligible content items, and data specifying the responsive content item can be provided in response to the content item request.

The process 400 can be implemented, for example, by the retargeting apparatus 120 or another data processing apparatus. In some implementations, the retargeting apparatus 120 is a data processing apparatus that includes one or more processors that are configured to perform actions of the process 400. In some implementations, a non-transitory computer readable medium can include instructions that when executed by a data processing apparatus cause the data processing apparatus to perform actions of the process 400.

A request for a content item that is to be provided with a search results page is received (402). In some implementations, the request includes data indicating that a search query was submitted by a user device. The data can also include a user identifier for the user device that submitted the search query. For example, a content distribution system may receive a request to provide an advertisement for presentation with a search results page. The request may include a search query (e.g., "DVD player") and a user identifier which identifies a computer (or other user device) from which the search query was submitted. The user identifier can be, for example, a user identifier (e.g., a cookie) that was placed on the user device when the retargeting script was executed or a user identifier that was placed on the user device prior to execution of the retargeting script, as described above with reference to FIG. 3 (e.g., 306).

A plurality of keyword targeted content items that are eligible for presentation with the search results page are identified (404). In some implementations, each eligible keyword targeted content item is a content item that is eligible for presentation based on the search query matching a targeting keyword for the keyword targeted content item. As mentioned above, for the purposes of this disclosure, the eligibility of a keyword targeted content item does not require that the user identifier referenced by the content item request match a retargeted identifier that is included in a set of retargeted identifiers. For example, assume that the search query submitted by the user is "DVD player." In this example, a keyword targeted advertisement may be eligible for presentation based on "DVD player" matching a targeting keyword (for example, "DVD", "player", or "DVD player") for the keyword targeted advertisement (i.e., irrespective of whether a user identifier is referenced by the content item request or whether a user identifier referenced by the content item request matches a retargeted identifier that is included in a retargeting set).

A determination is made that one or more retargeted content items are eligible for presentation with the search results page (406). In some implementations, each retargeted content item is a content item for which presentation eligibility is conditioned, at least in part, on a user identifier that is referenced by the content item request matching a retargeted identifier that is included in a retargeting set. The presentation eligibility of a retargeted content item can further be conditioned on a search query referenced by the content item request matching a targeting keyword for the retargeted content item.

For example, assume that a particular advertisement is associated with the targeting keyword "DVD," and that the advertiser has specified that the particular advertisement is only eligible for presentation if the content item request includes a user identifier (e.g., identifier A) that matches a retargeted identifier (e.g., identifiers A, B, or C) in a specified retargeting set (e.g., a set of user identifiers for user devices that have requested a DVD page from the advertiser's website). Further assume that a content item request that references the search query (e.g., "DVD") is received. In this example, a determination can be made that the search query matches the targeting keyword (e.g., "DVD"). However, in this example, the particular advertisement will not be eligible for presentation in response to the content item request (e.g., on the search results page) unless it is further determined that the user identifier that is referenced by the content item request matches a retargeted identifier from the retargeting set.

As described above, an advertiser can specify additional targeting criteria for advertisements. For example, in addition to specifying that presentation eligibility for an advertisement is conditioned on the user identifier that is included in the content item request matching a retargeted identifier that is in a particular retargeting set, an advertiser can further specify that the user not match a non-targeted user identifier in a set of non-targeted identifiers. A non-targeted identifier is a user identifier for a user (or user device) that is used to prevent an advertisement from being eligible for presentation.

For example, if an advertiser that sells DVD players has recently (e.g., within 1 week) sold a DVD player to a particular user, the advertiser may wish to prevent advertisements for the DVD player to be provided to the user. In this example, the advertiser may add the user identifier for the user to a set of non-targeted user identifiers (e.g., thereby identifying the user identifier as a non-targeted identifier) and specify that the advertisements for the DVD players not be eligible for presentation when the user identifier that is included in the content item request matches a non-targeted identifier that is included in the set of non-targeted user identifiers.

In some implementations, retargeted content items that are eligible for presentation in response to content item request can be identified, for example, by first identifying a set of retargeting content items that are targeted using keywords that are matched by the search query. Once this set of retargeted content items has been identified, a further determination of whether additional targeting criteria for each of the retargeted content items can be made. For example, for each of the retargeted content items in the set, a determination can be made whether the user identifier that is included in the content item request matches a retargeted identifier that is included in a retargeting set with which the retargeted content item is targeted. If a match between the user identifier and the retargeting set for a particular retargeted content item is determined to not exist, the retargeted content item can be removed from (or prevented from inclusion in) a set of eligible retargeted content items for the content item request.

Note that in some implementations, retargeted content items and keyword targeted content items that that are targeted using keywords that match the search query can all be identified together based on their targeting keywords. The retargeted advertisements can then be identified as such based on the retargeted advertisements being further targeted using a retargeting set.

In some implementations, the retargeted content items that are determined to be eligible for presentation can be limited, for example, to retargeted content items that are targeted using retargeting sets that contain at least a pre-specified minimum number of retargeted identifiers. For example, each retargeted advertisement that is eligible for presentation can be required to be targeted using retargeting sets that include more than 1,000 (or another threshold number of) unique retargeted identifiers in order to protect the privacy of users (e.g., in addition to using user identifiers that are identity neutral and do not contain personal information). If a particular retargeting set is determined to have fewer than the pre-specified minimum number of retargeted identifiers, the particular retargeting set can be disabled and/or content items that are eligible for presentation based on the particular retargeting set can be removed from the set of eligible retargeted content items.

A retargeted content item is removed from the plurality of content items eligible for presentation in response to determining that a user identifier matches a particular non-targeted user identifier in a set of non-targeted user identifiers. For example, if a user identifier matches a particular non-targeted user identifier in a set of non-targeted user identifiers for a retargeted advertisement, the retargeted advertisement may be removed from the set of advertisements that are eligible for presentation with a search results page.

In some implementations, a determination is optionally made that a particular keyword targeted content item and at least one eligible retargeted content item are both provided by the same content item provider (408). For example, a content distribution system may determine that a particular keyword targeted advertisement and at least one of the retargeted advertisements are both provided by the same advertiser. The determination can be made, for example, based on a determination that each of the keyword targeted content item and the retargeted content item are both identified as belonging to a same advertisement management account. The determination can also be made, for example, based on the particular content item and the retargeted content item each being included in the same advertisement campaign.

In response to determining that the particular keyword targeted content item and at least one of the eligible retargeted content items is provided by a same content item provider, the particular keyword targeted content item can be optionally removed from the plurality of keyword targeted content items that are eligible for presentation (410). For example, if a keyword targeted advertisement and a retargeted advertisement from a same advertiser are both eligible for presentation, the keyword targeted advertisement may be deemed ineligible, for example, so that bids for the advertisements for which the advertiser has provided more specific targeting criteria (e.g., retargeted content items) are used in the auction. This prevents an advertisers two sets of advertisements from competing in the auction. Other techniques for selecting eligible content items from among multiple sets of content items that are provided by a same advertiser can also be used (e.g., selecting the set of advertisements having a higher bid or higher historical performance measure).

A responsive content item to be presented with the search results page is selected (412). In some implementations, the responsive content item is selected based at least in part on bids that are associated with each of the keyword targeted content items that are eligible for presentation with the search results page and bids for each of the retargeted content items that are eligible for presentation with the search results page. For example, using the bids, a content distribution system may conduct an auction to select an advertisement to be presented with the search results page. The winner of the auction (i.e., the advertisement that is selected) may be the keyword targeted advertisement or retargeted advertisement with the highest auction score. The auction score may be based on the bid and/or advertisement quality measures associated with each advertisement.

Data specifying the responsive content item is provided (414). For example, a content distribution system may provide data specifying a network location from which the winning advertisement can be obtained by the user device. Alternatively, the advertisement itself can be provided to the user device in response to the request.

Figure 5:
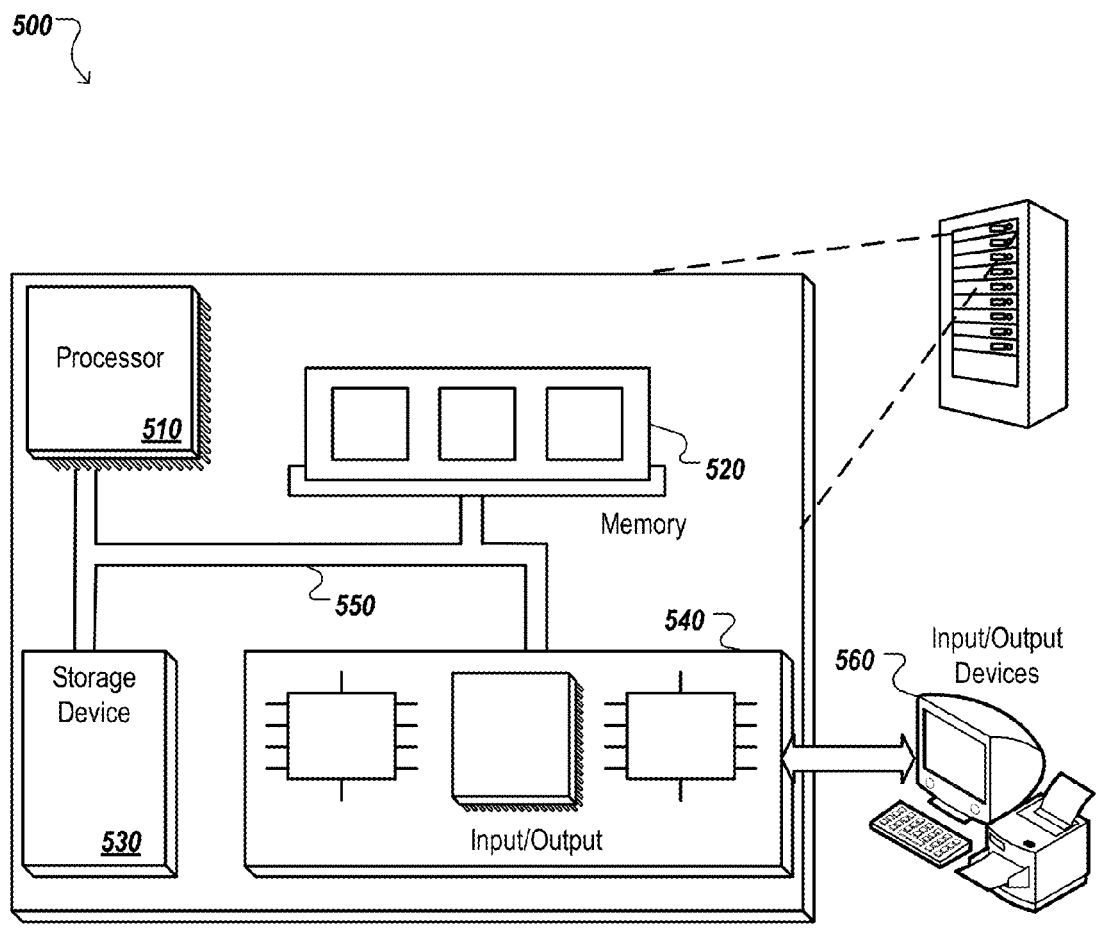
FIG. 5 is a block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530. The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of selecting content items based on prior interactions with webpages for a retargeting campaign, comprising:

identifying, by a data processing system having one or more processors, a first match between a search query and a keyword for one or more retargeted content items, the search query received from a client device subsequent to the client device performing a pre-specified action;

identifying, by the data processing system, a second match between an account identifier associated with the search query and a retargeted identifier stored in a retargeting set, the account identifier also associated with the client device, the retargeted identifier included in the retargeting set responsive to the client device performing the pre-specified interaction on a prior code segment;

determining, by the data processing system, that one or more retargeted content items are eligible for presentation with a search results page based on the first match and the second match;

identifying, by the data processing system, a plurality of keyword related content items eligible for presentation within the search results page, each of the plurality of keyword related content items eligible for presentation based on the first match;

providing, by the data processing system, to a content selection system, the plurality of keyword related content items eligible for presentation;

providing, by the data processing system, to the content selection system, responsive to identifying the second match, the one or more retargeted content items eligible for presentation, at least one of the retargeted content items different from any eligible keyword related content item from a content item provider;

receiving, by the data processing system, from the content selection system, a content item, the content item selected by the content selection system from the one or more retargeted content items based on first bid values associated with each of the keyword related content items eligible for presentation and based on second bid values associated with each of the one or more retargeted content items eligible for presentation, the first bid values different from the second bid values; and providing, by the data processing system, to the client device, data specifying the content item to be presented with the search results page.

2. The method of claim 1, comprising:

receiving, by the data processing system, from the content selection system, the content item to be presented with the search results page selected by the content selection system based on a first bid value associated with the retargeted content item being greater than a second bid value associated with the keyword related content item.

3. The method of claim 1, comprising:

determining, by the data processing system, a particular keyword related content item from the plurality of keyword related content items and at least one of the one or more retargeted content items are to be provided by the content item provider; and removing, by the data processing system, the particular keyword related content item from the plurality of keyword related content items, responsive to determining that the particular keyword related content item and at least one of the one or more retargeted content items are provided by the content item provider.

4. The method of claim 1, comprising:

removing, by the data processing system, a subset of the one or more retargeted content items associated with the retargeted identifier not matched with the account identifier, responsive to identifying the second match.

5. The method of claim 1, comprising:
receiving, by the data processing system, from a code segment executing at the client device, interaction data indicating that the code segment was executed, the interaction data including the account identifier for the client device for storing in the retargeting set.

6. The method of claim 1, comprising:
receiving, by the data processing system, from a code segment executing at the client device, interaction data indicating that the code segment was executed, the interaction data including temporal expiration data associated with the account identifier specifying a time at which the account identifier is removed from the retargeting set.

7. The method of claim 6, comprising:
removing, by the data processing system, the retargeted identifier from the retargeting set at the time specified by the temporal expiration data.

8. The method of claim 1, comprising:
identifying, by the data processing system, a subset group of the plurality of keyword related content items, responsive to a request from the content item provider; and
receiving, by the data processing system, from the content selection system, the content item to be presented with the search results page from the subset group selected by the content selection system based on additional criteria.

9. The method of claim 1, comprising:
including, by the data processing system, the retargeted identifier into the retargeting set, responsive to receiving interaction data indicating that the pre-specified interaction with a code segment executing at the client device occurred, the client device associated with the retargeted identifier.

10. The method of claim 1, comprising:
determining, by the data processing system, that a second account identifier is ineligible for retargeting; and
removing, by the data processing system, a retargeted identifier associated with the second account identifier from the retargeting set, responsive to determining that the second account identifier is ineligible.

11. A system for selecting content items based on prior interactions with webpages for a retargeting campaign, comprising:
a data processing system, having one or more processors, that:
identifies a first match between a search query and a keyword for one or more retargeted content items, the search query received from a client device subsequent to the client device performing a pre-specified action;
identifies a second match between an account identifier of the search query and a retargeted identifier stored in a retargeting set, the account identifier associated with the client device, the retargeted identifier included in the retargeting set responsive to the client device performing the pre-specified interaction on a prior code segment;
determines that one or more retargeted content items are eligible for presentation with a search results page based on the first match and the second match;
identifies a plurality of keyword related content items eligible for presentation within the search results page, each of the plurality of keyword related content items eligible for presentation based on the first match;
provides, to a content selection system, the plurality of keyword related content items eligible for presentation;
provides, to the content selection system, responsive to identifying the second match, the one or more retargeted content items eligible for presentation, at least one of the retargeted content items different from any eligible keyword related content item from a content item provider;
receives, from the content selection system, a content item, the content item selected by the content selection system from the one or more retargeted content items based on first bid values associated with each of the keyword related content items eligible for presentation and based on second bid values associated with each of the one or more retargeted content items eligible for presentation, the first bid values different from the second bid values; and
provides, to the client device, data specifying the content item to be presented with the search results page.

12. The system of claim 11, wherein the data processing system:
receives, from the content selection system, the content item to be presented with the search results page selected by the content selection system based on a first bid value associated with the retargeted content item being greater than a second bid value associated with the keyword related content item.

13. The system of claim 11, wherein the data processing system:
determines a particular keyword related content item from the plurality of keyword related content items and at least one of the one or more retargeted content items are to be provided by the content item provider; and
removes the particular keyword related content item from the plurality of keyword targeted related content items, responsive to determining that the particular keyword related content item and at least one of the one or more retargeted content items are provided by the content item provider.

14. The system of claim 11, wherein the data processing system:
removes a subset of the one or more retargeted content items associated with the retargeted identifier not matched with the account identifier, responsive to identifying the second match.

15. The system of claim 11, wherein the data processing system:
receives, from a code segment executing at the client device, interaction data indicating that the code segment was executed, the interaction data including the account identifier for the client device for storing in the retargeting set.

16. The system of claim 11, wherein the data processing system:
receives, from a code segment executing at the client device, interaction data indicating that the code segment was executed, the interaction data including temporal expiration data associated with the account identifier specifying a time at which the account identifier is removed from the retargeting set.

17. The system of claim 16, wherein the data processing system:

removes the retargeted identifier from the retargeting set at the time specified by the temporal expiration data.

18. The system of claim 11, wherein the data processing system:
identifies a subset group of the plurality of keyword related content items, responsive to a request from the content item provider; and
receives, from the content selection system, the content item to be presented with the search results page from the subset group selected by the content selection system based on additional criteria.

19. The system of claim 11, wherein the data processing system:
includes the retargeted identifier into the retargeting set, responsive to receiving interaction data indicating that the pre-specified interaction with a code segment executing at the client device occurred, the client device associated with the retargeted identifier.

20. The system of claim 11, wherein the data processing system:
determines that a second account identifier is ineligible for retargeting; and
removes a second retargeted identifier associated with the second account identifier from the retargeting set, responsive to determining that the second account identifier is on ineligible.

* * * * *